(12) United States Patent
Garry et al.

(10) Patent No.: US 12,170,394 B2
(45) Date of Patent: Dec. 17, 2024

(54) SMART LOCK HAVING AN ELECTROMECHANICAL KEY

(71) Applicant: NETATMO, Boulogne Billancourt (FR)

(72) Inventors: Florent Garry, Paris (FR); Minglai Chen, Meudon-la-Forêt (FR); Clémence Gerard, Meudon (FR)

(73) Assignee: NETATMO, Boulogne Billancourt (FR)

( * ) Notice: Subject to any disclaimer, the term of this patent is extended or adjusted under 35 U.S.C. 154(b) by 208 days.

(21) Appl. No.: 17/777,673

(22) PCT Filed: Nov. 23, 2020

(86) PCT No.: PCT/EP2020/083052
§ 371 (c)(1),
(2) Date: May 18, 2022

(87) PCT Pub. No.: WO2021/110453
PCT Pub. Date: Jun. 10, 2021

(65) Prior Publication Data
US 2023/0006330 A1    Jan. 5, 2023

(30) Foreign Application Priority Data

Dec. 4, 2019 (EP) .................................... 19306567

(51) Int. Cl.
*H01Q 1/22* (2006.01)
*G07C 9/00* (2020.01)
*G07C 9/29* (2020.01)

(52) U.S. Cl.
CPC ....... *H01Q 1/2216* (2013.01); *G07C 9/00174* (2013.01); *G07C 9/00182* (2013.01);
(Continued)

(58) Field of Classification Search
CPC .......... H01Q 1/2216; H01Q 7/00; H01Q 9/42; G07C 9/00174; G07C 9/00182;
(Continued)

(56) References Cited

U.S. PATENT DOCUMENTS

| 5,532,522 A | 7/1996 | Dietz et al. |
| 5,708,308 A * | 1/1998 | Katayama ............... B60R 25/04 |
| | | 235/382.5 |

(Continued)

FOREIGN PATENT DOCUMENTS

| CN | 1844628 A | 10/2006 |
| CN | 206337913 U | 7/2017 |

(Continued)

OTHER PUBLICATIONS

CN206337913—English translation whole document; Intelligence lock based on passive radio-frequency identification label. (Dec. 30, 2016) Hu, Hai Bo et al; p. 1 to p. 5. (Year: 2016).*

(Continued)

*Primary Examiner* — Nam V Nguyen
(74) *Attorney, Agent, or Firm* — MEAGHER EMANUEL LAKS GOLDBERG & LIAO, LLP

(57) ABSTRACT

The invention concerns a locking mechanism (10) configured to switch from a locked state to an unlocked state, comprising:
a. a processor (11) configured to read an identification code of an identification key (13) and configured to cause the locking mechanism (10) to switch from the locked state to the unlocked state if the identification code of the identification key (13) is an authorized code of the locking mechanism (10),
b. a printed circuit board (14) in a first plane comprising an aperture (15) configured to accept insertion of the identification key (13) according to a first axis (Y)

(Continued)

secant to the printed circuit board (14), the identification key (13) comprising a NFC passive part (16), c. a NFC active part comprising a wire antenna (18) positioned on the printed circuit board (14), the wire antenna (18) comprising a first at least one winding around the aperture (15), the wire antenna being connected to the processor (11), wherein the locking mechanism is configured to establish a NFC communication between the NFC active part of the locking mechanism and the NFC passive part (16) of the identification key (13) when the identification key (13) is inserted into the aperture (15).

12 Claims, 5 Drawing Sheets

(52) U.S. Cl.
CPC ..... *G07C 9/00309* (2013.01); *G07C 9/00944* (2013.01); *G07C 9/29* (2020.01); *G07C 2009/00412* (2013.01); *G07C 2009/00611* (2013.01); *G07C 2009/00642* (2013.01); *G07C 2009/00777* (2013.01)

(58) Field of Classification Search
CPC .. G07C 9/00309; G07C 9/00944; G07C 9/29; G07C 2009/00412; G07C 2009/00611; G07C 2009/00642; G07C 2009/00777; H04B 5/70
USPC ........................................................ 340/5.61
See application file for complete search history.

(56) References Cited

U.S. PATENT DOCUMENTS

| | | | | |
|---|---|---|---|---|
| 6,188,140 | B1* | 2/2001 | Kito | G07C 9/00944 340/426.11 |
| 7,116,214 | B2* | 10/2006 | Ghabra | H01Q 7/00 340/541 |
| 7,397,343 | B1* | 7/2008 | Gokcebay | G07C 9/00944 70/283.1 |
| 2013/0341414 | A1 | 12/2013 | Ziller | |
| 2019/0206157 | A1* | 7/2019 | Cazalis | G07C 9/22 |

FOREIGN PATENT DOCUMENTS

| | | | |
|---|---|---|---|
| CN | 108643713 A | 10/2018 | |
| CN | 208073145 U | 11/2018 | |
| CN | 109493497 A | 3/2019 | |
| CN | 110533803 A | 12/2019 | |
| EP | 0695676 A2 | 2/1996 | |
| EP | 1155427 A1 * | 11/2001 | ............. B60R 25/02 |
| EP | 2017794 A1 * | 1/2009 | ......... G07C 9/00896 |
| EP | 3373457 A1 | 9/2018 | |
| EP | 3506215 A1 | 7/2019 | |
| JP | 2014203385 A | 10/2014 | |
| WO | 2017191663 A1 | 11/2017 | |

OTHER PUBLICATIONS

Chinese Office Action and Search Report for corresponding Chinese Application No. 202080080628.0, dated Nov. 17, 2023.
International Search Report and Written Opinion for corresponding PCT Application No. PCT/EP2020/083052, dated Feb. 10, 2021.

* cited by examiner

SMART LOCK HAVING AN ELECTROMECHANICAL KEY

FIELD

The invention relates to the field of secure key control and concerns a locking mechanism operating with a NFC system and configured to switch between a locked state and an unlocked state.

BACKGROUND

Electromechanical lock and key with identification code are widespread. They enable authorized key holders to have access to locked rooms if the identification code of the key corresponds to a predetermined code in relation with the electromechanical lock. The key may be an ordinary looking key to insert into the lock.

The electromechanical lock comprises a processor configured to compare the identification code of the key with the predetermined code. If the identification code corresponds to the predetermined code, the electromechanical lock switches from its locked state to its unlocked state.

Commonly locks, also called locking mechanisms, are formed with a body that can be easily unscrewed by a locksmith to facilitate rekeying. The body has the function to lock and unlock the lock. A lock body may be found under the form of a European cylinder (defined by the DIN18251). A European cylinder is a type of lock cylinder. There exist other profiles of lock bodies like the oval cylinder that is used in the Nordic countries. A body may not be in the form of a cylinder. A lock body may be inserted into a lock or a mortise lock or a slot-in lock. This function offers the advantage of allowing its change without altering the boltwork hardware. Removing the body typically requires only loosening a set screw, then sliding the body from the boltwork.

The smart locking mechanism comprises an interface configured to receive an identification code from an identification key. The identification key communicates with the locking mechanism using a NFC system or another RF technology that uses a passive device. NFC stands for Near Field Communication. It is a wireless technology for near field applications. In general NFC is used to communicate within a 5 centimeters distance using the 13.56 MHz frequency. The NFC system comprises an active part, called the reader, and a passive part, called the tag. When operating, the reader generates an initial 13.56 MHz signal. If powerful enough, this signal powers up the tag and a communication link is activated between the reader and the tag.

NFC systems are used in a large variety of applications such as pay by phone, contactless payment with the credit card, building access badge, etc. In these applications, the tag and its antenna are flat, and the antennas used with the reader are also flat. When provided with energy, the chip of the tag sends data to the reader. The tag may also receive data from the reader. And more generally the tag may communicate any kind of information. There is a communication between the active and the passive part.

When used within a locking mechanism, the tag is positioned within the identification key and the reader is positioned within the locking mechanism. If the communication between the tag and the reader, i.e. between the key and the lock mechanism, is successful, the locking mechanism is unlocked, thus enabling the user to open/close the door.

More precisely the tag comprises an antenna and a chip and operates as follows: the magnetic radiations from the reader antenna provides the tag with energy via the tag antenna. Being fed with energy, the chip of the tag sends data to the reader. If the data sent from the tag to the reader are in agreement with the data expected from the reader, the identification key is recognized as an authorized one and the reader sends an authorization signal to the processor of the locking mechanism to unlock the door. It is to be noticed that the tag may also receive data from the reader, and/or may communicate any kind of information.

In order to ensure a high level of security of the locking mechanism, the tag is equipped with a hardware cryptographic engine. It results that the tag requires a lot of energy to run its cryptographic hardware.

Additionally, the tag must fit in the identification key, which is very similar to an ordinary looking key. It means that the tag diameter should not exceed 5 millimeters and the tag length should be less than 12 millimeters. Last but not least, the locking mechanism into which the reader and its antenna are installed may comprise a metallic body and metallic parts, typically the key hole into which the identification key is to be inserted. The metallic parts prevent the radio waves from radiating properly. The radiation lines going through these zones are attenuated and scattered, thereby leading to a decrease of the energy at the disposal of the tag to operate.

There is consequently a need for establishing a connection between the active part and the passive part of a NFC system to transmit information, identification, software updates, etc. In the field of locking mechanism, there is a need for a smart locking mechanism configured to switch from a locked state to an unlocked state, based on the communication of an identification code between the locking mechanism and an authorized identification key using the NFC system, which ensures a high level of security with a complex cryptography with a low power consumption while solving the integration problems related to the small dimensions of the lock mechanism. The identification key enables the authentication with the lock. Therefore, the user can unlock the door, or lock it. It enables also all type of communication between the tag and the door.

SUMMARY OF THE INVENTION

The proposed solution to overcome this drawback is a locking mechanism with the establishment of NFC communication between the locking mechanism and the identification key, with a particular cooperation of the NFC passive part of the key and the NFC active part of the locking mechanism.

To this end, the subject of the invention is a locking mechanism configured to switch from a locked state to an unlocked state, comprising:

a. a processor configured to read an identification code of an identification key and configured to cause the locking mechanism to switch from the locked state to the unlocked state if the identification code of the identification key is an authorized code of the locking mechanism,
   b. a printed circuit board in a first plane comprising an aperture configured to accept insertion of the identification key according to a first axis secant to the printed circuit board, the identification key comprising a NFC passive part,
   c. a NFC active part comprising a wire antenna positioned on the printed circuit board, the wire antenna comprising a first at least one winding around the aperture, the wire antenna being connected to the processor, wherein the locking mechanism is configured to establish a NFC communication between the NFC active part of the locking mechanism and the NFC passive part of the identification key when the identification key is inserted into the aperture.

According to one aspect of the invention, the wire antenna of the NFC active part comprises a second at least one winding around the aperture, the first at least one winding being positioned on a first side of the printed circuit board and the second at least one winding being positioned on a second side of the printed circuit board, opposite to the first side, and/or the wire antenna of the NFC active part comprises at least a third at least one winding around the aperture, the third at least one winding being positioned inside the printed circuit board.

Advantageously, the first axis is substantially perpendicular to the printed circuit board.

Advantageously, the locking mechanism of the invention may comprise a battery configured to provide the NFC active part with energy.

Advantageously, the wire antenna of the NFC active part is configured to generate a magnetic field when the NFC active part is provided with energy, thereby providing energy to the NFC passive part of the identification key.

Advantageously, the NFC passive part of the identification key comprises a wire antenna, a chip connected to the wire antenna and configured to store the identification code.

Advantageously, the NFC passive part of the identification key comprises a core around which the wire antenna is wounded, preferably a ferrite core.

Advantageously, the wire antenna of the NFC passive part is configured to provide the chip with energy when the NFC active part generates a magnetic field.

Advantageously, the processor comprises an algorithm of asymmetrical cryptography configured to verify that the identification code is an authorized code of the locking mechanism.

The invention also concerns an identification key configured to cooperate with a locking mechanism, configured to switch from a locked state to an unlocked state, said locking mechanism comprising:
  a. a processor configured to read an identification code of the identification key and configured to cause the locking mechanism to switch from the locked state to the unlocked state if the identification code of the identification key is an authorized code of the locking mechanism,
  b. a printed circuit board in a first plane comprising an aperture configured to accept insertion of the identification key according to a first axis secant to the printed circuit board,
  c. a NFC active part comprising a wire antenna positioned on the printed circuit board, the wire antenna comprising a first at least one winding around the aperture, the wire antenna being connected to the processor,
the identification key comprising a NFC passive part, wherein the identification key is adapted to be inserted into the aperture, thereby establishing a NFC communication between the NFC active part of the locking mechanism and the NFC passive part of the identification key.

Advantageously, the NFC passive part of the identification key comprises a wire antenna, a chip connected to the wire antenna and configured to store the identification code.

Advantageously, the NFC passive part of the identification key comprises a core around which the wire antenna is wounded, preferably a ferrite core.

Advantageously, the wire antenna of the NFC passive part is configured to provide the chip with energy when the NFC active part of the locking mechanism generates a magnetic field.

The invention also concerns an identification key configured to cooperate with a locking set comprising such a locking mechanism and such an identification key.

The invention also concerns a method for establishing a NFC communication between a NFC active part of a locking mechanism and a NFC passive part of an identification key, the locking mechanism configured to switch from a locked state to an unlocked state, said locking mechanism comprising a processor configured to read an identification code of the identification key and configured to cause the locking mechanism to switch from the locked state to the unlocked state if the identification code of the identification key is an authorized code of the locking mechanism, a printed circuit board in a first plane comprising an aperture configured to accept insertion of the identification key according to a first axis secant to the printed circuit board, and a NFC active part comprising a wire antenna positioned on the printed circuit board, the wire antenna comprising a first at least one winding around the aperture, the wire antenna being connected to the processor, the identification key comprising a NFC passive part, said method comprising the steps of:
  a. inserting the identification key into the aperture;
  b. establishing a NFC communication between the NFC active part of the locking mechanism and the NFC passive part of the identification key.

Advantageously, the NFC passive part of the identification key comprising a wire antenna, a chip connected to the wire antenna and configured to store the identification code, wherein the step of establishing the NFC communication between the NFC active part of the locking mechanism and the NFC passive part of the identification key comprises the steps of:
  a. generating a magnetic field by the wire antenna of the NFC active part, thereby providing energy to the NFC passive part of the identification key;
  b. providing the chip with energy by the wire antenna of the NFC passive part.

Advantageously, the method of the invention further comprises the steps of sending an identification code from the chip of the NFC passive part to the NFC active part, determining by the processor of the locking mechanism whether the identification code sent from the chip is an authorized code.

BRIEF DESCRIPTION OF THE DRAWINGS

The accompanying drawings illustrate various non-limiting, example, innovative aspects in accordance with the present descriptions.

For the sake of clarity, the same elements have the same references in the various figures.

DETAILED DESCRIPTION

Figure 1:
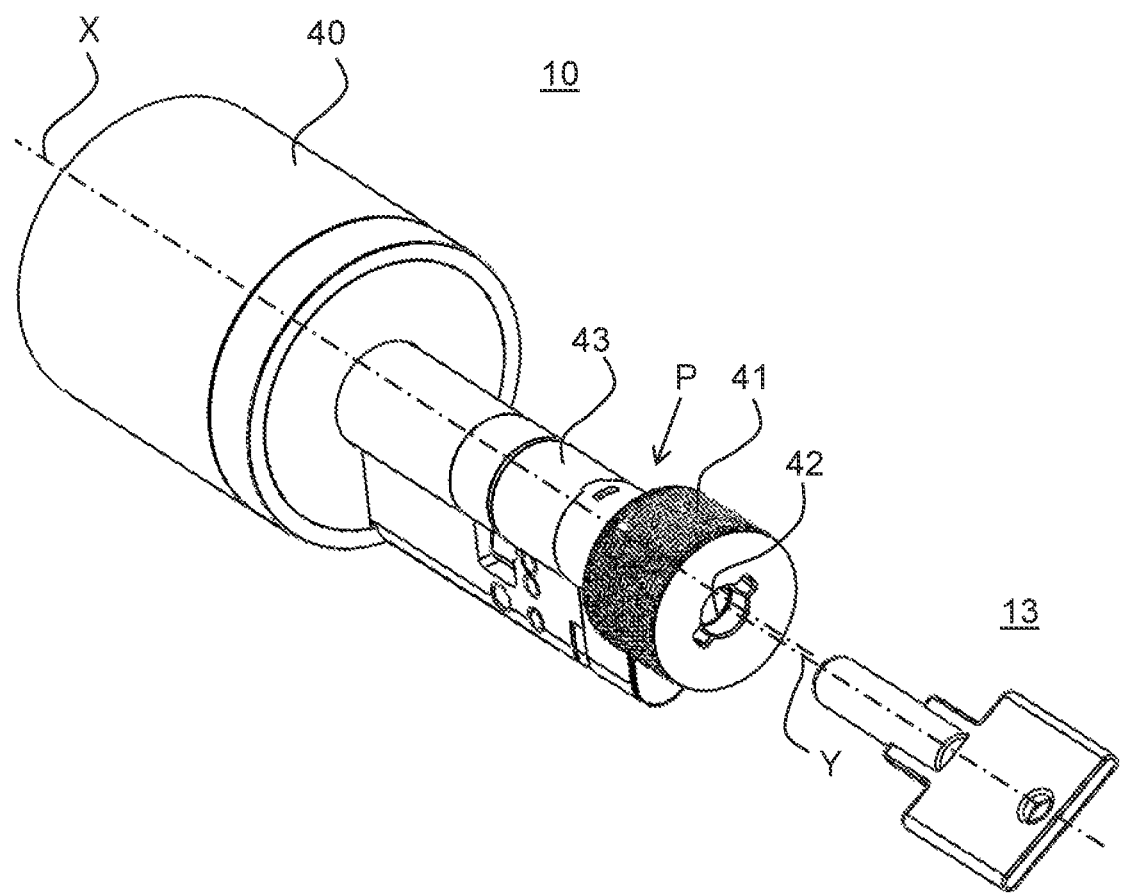
FIG. 1 schematically represents a locking mechanism and an identification key adapted to implement the invention.

Although many of the features of this invention are described in relation to a door, it is understood that they are generally applicable to any opening unit, such as a window. Moreover, these features are also applicable to many other devices, for example a padlock, having a locked state and an unlocked state.

In order to illustrate the invention, the explanations are related to a door. Note that these explanations may be applied similarly to any opening unit. A door is an opening unit enabling the access to a room (or from a room to the outside) through an aperture. The door is connected to a door frame that frames the aperture and is fixed to the walls around the aperture. In an unlocked state of the door, the door is mobile in relation to the door frame, typically mobile in rotation around doors hinges (or in translation in the case the door and the door frame are configured to let the door slide through a part of the door frame and into the wall). The door may be in an open configuration or a closed configuration. In the closed configuration, the door covers the aperture (i.e. no one can go through the aperture). Typically the door is equipped with a lock mechanism. The lock mechanism has a latch that is either inserted into a slot of the door frame (the door is closed) or retracted inside the door (the door is no longer attached to the door frame and may be open). In the closed configuration, the latch is inserted into the slot of the door frame. In existing lock mechanisms, a lock clutch is connected to the latch. The lock clutch is usually engaged with both the indoor and outdoor door knobs. This enables a user to activate the lock clutch to make the latch move by moving one of the door knobs. Therefore a user has to move a door knob of the door to switch from the closed configuration of the door to the open configuration of the door. Indeed, the lock clutch being engaged with the knob, the movement of the knob leads to the movement of the latch. Moving the door knob makes the latch retract into the door. The user can pull or push the door to open it.

In the closed configuration of the door, the lock mechanism can be either in a locked state or an unlocked state. The unlocked state corresponds to the case discussed above. The door may be open by a user when activating a door knob and pushing or pulling the door. More precisely, the lock mechanism has a deadbolt entirely positioned inside the locking mechanism in the unlocked state. In the locked state, this deadbolt projects beyond the lock mechanism and is inserted into a slot of the door frame, thus locking the door to the frame. The movement of the deadbolt can be mechanically obtained, for example by a rotation of a key inserted into the locking mechanism. The rotation of the key clockwise, respectively anticlockwise, causes the deadbolt to translate either outside the lock mechanism to be inserted into the slot of the door frame, or inside the lock mechanism. To switch from the locked state of the door to the unlocked state of the door, a user has to rotate the key with the corresponding rotation of the key inside the lock mechanism. As an alternative to a rotation of the key, the lock mechanism may be unlocked by an authorized identification key. It is for example possible to authenticate with a smartphone (with BLE-Bluetooth Low Energy-) in addition to the key. But the user will have to rotate with his/her hand the outside handle of the lock and rotate with the corresponding rotation exactly the same way as if the user was using a key. Indeed, once authenticate the motor moves and enables the user to move the deadlock. Then the user can move the deadlock in the way he/she wants. When it is identified in the vicinity of the lock mechanism, the authorized identification key may activate a motor in the lock mechanism that causes the deadbolt to translate. More precisely the motor can only enable the user to move the deadbolt using the key or the outside handle. Then, to open the door, the user turns a door knob or pushes a door handle of the door, as explained before. In other words, the locked state corresponds to the fact that the user cannot action the door (i.e. open it or close it).

These explanations are intended to understand the meaning of the wording of locked state and unlocked state of the locking mechanism used in the description.

FIG. 1 schematically represents a locking mechanism 10 and an identification key 13 adapted to implement the invention. The locking mechanism 10 comprises a cylinder 43 intended to be inserted into the door, a handle 40 intended to be placed inside a room to actuate the locking mechanism, thus enabling to open or close the door in the unlocked state. The locking mechanism comprises a front part 41 positioned outside the room. This front part 41 comprises an aperture 42 intended to receive the identification key 13. Advantageously, the aperture 42 and the outer part of the identification key 13 have a complementary form, but the outer part of the identification key 13 may also be loose in the aperture 42. The locking mechanism 10 may extend according to a longitudinal axis X. The locking mechanism may be configured so that the identification key 13 is to be inserted through the aperture 42 according to a first axis Y. The first axis Y may be parallel to the longitudinal axis X, but it may also be secant.

Figure 2:
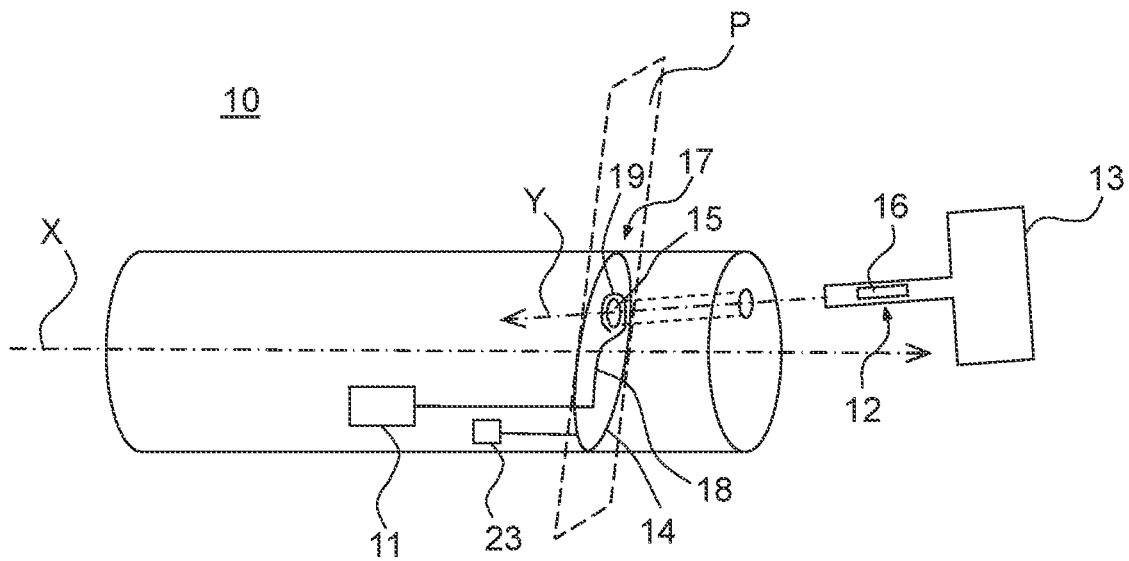
FIG. 2 schematically represents a first embodiment of a locking mechanism according to the invention.

FIG. 2 schematically represents a first embodiment of a locking mechanism 10 according to the invention. The locking mechanism 10 is configured to switch from a locked state to an unlocked state. The locking mechanism 10 comprises a processor 11 configured to read an identification code 12 of an identification key 13 and configured to cause the locking mechanism 10 to switch from the locked state to the unlocked state if the identification code 12 of the identification key 13 is an authorized code of the locking mechanism 10. The locking mechanism 10 comprises a printed circuit board 14 in a first plane P comprising an aperture 15 configured to accept insertion of the identification key 13 according to a first axis Y secant to the printed circuit board 14, the identification key 13 comprising a NFC passive part 16. The locking mechanism 10 further comprises a NFC active part 17 comprising a wire antenna 18 positioned on the printed circuit board 14, the wire antenna 18 comprising a first at least one winding 19 around the aperture 15, the wire antenna 18 being connected to the processor 11. According to the invention, the locking mechanism is configured to establish a NFC communication between the NFC active part 17 of the locking mechanism and the NFC passive part 16 of the identification key 13 when the identification key 13 is inserted into the aperture 15.

In a preferred embodiment of the locking mechanism 10, the first axis Y is substantially perpendicular to the printed circuit board 14.

Figure 3:
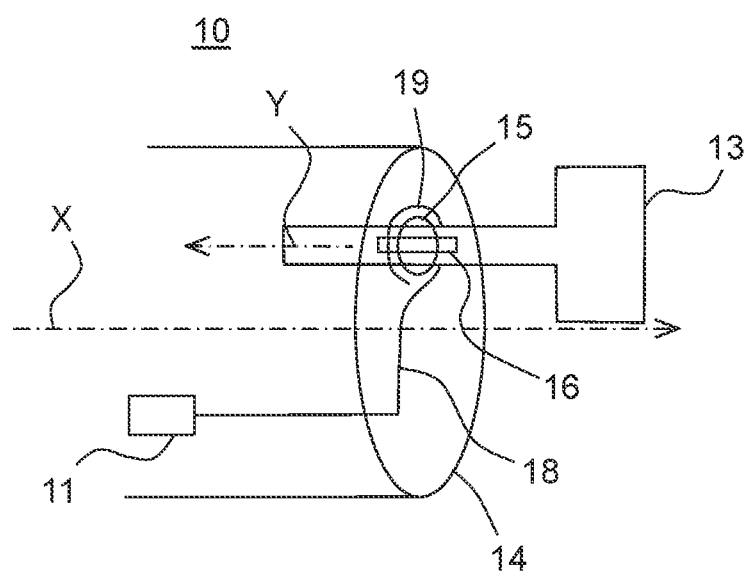
FIG. 3 schematically represents a detailed view of an embodiment of a locking mechanism according to the invention.

FIG. 3 schematically represents a detailed view of an embodiment of a locking mechanism 10 according to the invention. The identification 13 is inserted through the aperture 15 of the printed circuit board 14. The passive part 16 of the identification key 13 is positioned in the vicinity of the aperture 15. In other words, the winding 19 of the wire antenna 18 of the NFC active part 17 is around the NFC passive part 16 of the identification key 13. Thanks to this relative position between the NFC active part 17 of the locking mechanism 10 and the NFC passive part 16 of the identification key 13, the NFC passive part 16 can communicate the identification code 12 of the identification key 13 to the NFC active part 17 of the locking mechanism 10. The processor 11 of the locking mechanism 10 is able to determine whether the identification code 12 is an authorized code for the locking mechanism 10.

Contrary to usual NFC application, the NFC reader (NFC active part 17) and the NFC tag (NFC passive part 16) antenna are not parallel and put on each other to operate. In the invention, the NFC passive part 16 goes through the wire antenna 18 of the NFC active part 17. The relative movement between the NFC reader and the NFC tag is a translation from one part along the other part.

Due to the dimension constraints, the NFC passive part 16 is in the identification key 13 and the NFC active part 17 is in the locking mechanism 10, but the invention would apply inversely in a similar manner. More generally, the invention relies on the relative movement between the reader and the tag, by inserting the tag through the windings of the antenna of the reader, to provide the tag with energy and transfer information from the identification key 13 to the locking mechanism 10.

The invention also relates to an identification key 13. The identification key 13 is configured to cooperate with the locking mechanism 10, configured to switch from a locked state to an unlocked state. The locking mechanism 10 comprises the elements mentioned before: a processor 11 configured to read an identification code 12 of the identification key 13 and configured to cause the locking mechanism 10 to switch from the locked state to the unlocked state if the identification code 12 of the identification key 13 is an authorized code of the locking mechanism 10, a printed circuit board 14 in a first plane P comprising an aperture 15 configured to accept insertion of the identification key 13 according to a first axis Y secant to the printed circuit board 14, a NFC active part 17 comprising a wire antenna 18 positioned on the printed circuit board 14, the wire antenna 18 comprising a first at least one winding 19 around the aperture 15, the wire antenna 18 being connected to the processor 11. The identification key 13 comprises a NFC passive part 16. The identification key 13 of the invention is adapted to be inserted into the aperture 15, thereby establishing a NFC communication between the NFC active part 17 of the locking mechanism 10 and the NFC passive part 16 of the identification key 13.

Figure 7:
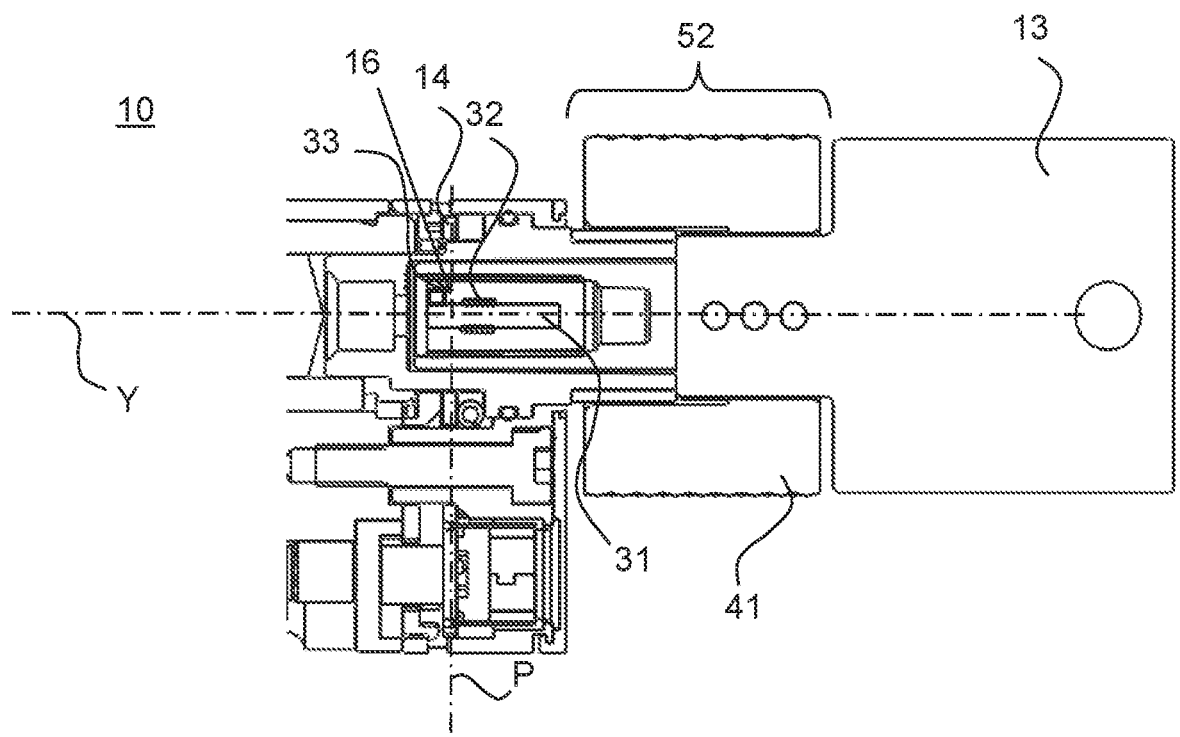
FIG. 7 schematically represents a cut view of the locking mechanism with an inserted identification key according to the invention.

As shown in FIG. 7, the NFC passive part 16 of the identification key 13 comprises a wire antenna 32 and a chip 33 connected to the wire antenna 32 and configured to store the identification code 12.

Advantageously, the NFC passive part 16 of the identification key 13 comprises a core 31 around which the wire antenna 32 is wounded, preferably a ferrite core.

The wire antenna 32 of the NFC passive part 16 is configured to provide the chip 33 with energy when the NFC active part 17 of the locking mechanism 10 generates a magnetic field.

Such a design enables that the NFC tag can be fitted within the identification key 13. This tag may take the shape of a cylinder with a copper coil rolled around the ferrite core. The antenna may for example (and in a non-limiting way) a 12 mm length.

The cooperation between the NFC active part 17 of the locking mechanism 10 and the NFC passive part 16 of the identification key 13 will appear more clearly with the description of the following figures.

Figure 4:
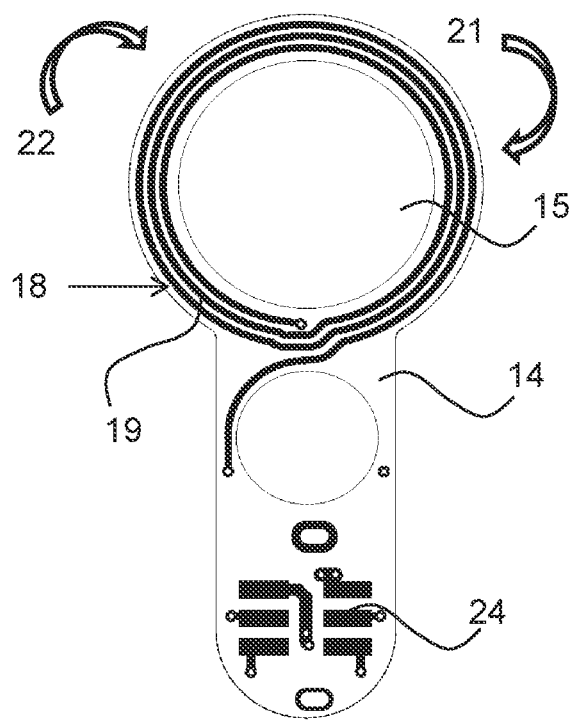
FIG. 4 schematically represents a printed circuit board and a wire antenna of the NFC active part of a locking mechanism according to the invention.

FIG. 4 schematically represents a printed circuit board 14 and a wire antenna 18 of the NFC active part of a locking mechanism 10 according to the invention. As mentioned before, the wire antenna 18 may comprise at least one winding 19 around the aperture 15. As depicted in the figure, the wire antenna 18 comprise three windings 19 around the aperture 15. It means that the wire antenna 18 makes three windings around the aperture 15 of the printed circuit board 14. The number of windings around the aperture is at least one and may be two, three, or even more. It constitutes a coil. The wire antenna 18 is for example a copper track.

The wire antenna 18 of the NFC active part 17 may comprise a second at least one winding 19 around the aperture 15. The first at least one winding is positioned on a first side 21 of the printed circuit board 14 and the second at least one winding 19 is positioned on a second side 22 of the printed circuit board 14, opposite to the first side 21, and/or the wire antenna 18 of the NFC active part 17 comprises at least a third at least one winding 19 around the aperture 15, the third at least one winding 19 being positioned inside the printed circuit board 14. The number of windings around the aperture and the number of coils formed (i.e. one on each side of the printed circuit board and inside the printed circuit board) influence the level of the magnetic field between the NFC parts.

The locking mechanism 10 comprises a battery 23 configured to provide the NFC active part 17 with energy.

The identification key 13 and its tag can be inserted into the locking mechanism, as usual. At the same time, thanks to the positioning of the printed circuit board 14 and its aperture 15, the identification key 13 and its tag is thus inserted in the aperture 15 of the printed circuit board 14 within the antenna 18, thus enabling the highest radiated emission of the reader's antenna as to power the tag and to enable a reliable communication between the NFC reader and NFC tag.

More precisely, once provided with energy, the wire antenna 18 of the NFC active part 17 is configured to generate a magnetic field when the NFC active part 17 is provided with energy, thereby providing energy to the NFC passive part 16 of the identification key 13. The NFC active part 17 may be for example wakened up every 300 ms in order to check if a NFC passive part is in its vicinity. When wakened, the NFC active part activates the RF for a very short time and compares the field data from the one saved in the last wake-up. If the data has been modified, the NFC active part considers that a NFC passive part is in its vicinity. In this case, the NFC active part is fully powered by the battery 23 in order to start the communication with the NFC passive part.

The processor 11 of the locking mechanism 10 advantageously comprises an algorithm of asymmetrical cryptography configured to verify that the identification code 12 is an authorized code of the locking mechanism 10. For example the locking mechanism 10 may comprise the Mifare Desfire EV2 tag from NXP. This tag is considered as one of the most secure one. It has an AES128 hardware cryptographic engine and is Common Criteria EALS+ security certified by the ANSSI. Such a cryptographic engine requires many calculations. It results that the locking mechanism requires more energy to operate.

It is to be noted that the invention is described in a non-limitative example of a tag sending data to the reader, but the invention applies similarly to a tag that can receive data from the reader. In the cited example, using the Mifare Desfire EV2 chip from NXP, it is possible to create applications on the tag that interact with the reader to complete the full secure authentication. The invention applies to a NFC active part and a NFC passive part that can communicate a large variety of information, that is to say not only a command to open/close a door.

The printed circuit board 14 may comprise a matching RF circuit 24. The RF matching circuit 24 enables an optimal communication link with a tag inserted in the metallic part of the locking mechanism 10. It is designed to enable a highly secure cryptographic exchange protocol with the identification key 13. In addition, it ensures the lowest power consumption for a reliable communication link. The matching circuit 24 is placed in the printed circuit board 14, i.e. on the same printed circuit board where the antenna 18 is placed, so as to avoid that the flex printed circuit board connecting the NFC antenna to the NFC read acts like an antenna. Furthermore the RF matching circuit 24 contributes to reduce metal impact on the antenna characteristics and the NFC communication.

Figure 5:
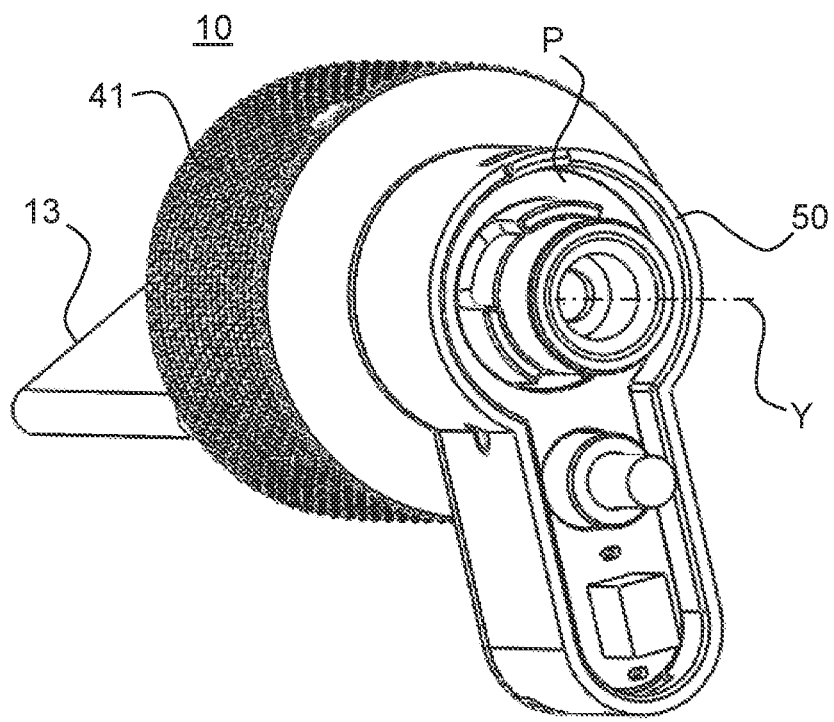
FIG. 5 schematically represents the rear part of a locking mechanism according to the invention.

FIG. 5 schematically represents the rear part of a locking mechanism 10 according to the invention. It should be kept in mind that the NFC active part 17 of the locking mechanism 10 and its wire antenna 18 are installed in a metallic environment 50 that prevents the radio waves from radiating properly. All the radiation lines going through the metallic part are attenuated and scattered.

The printed circuit board 14 is positioned in the first plane P. As represented in FIG. 4, the printed circuit board 14 may have the same form as the cylinder of the locking mechanism 10, so as to fit within the metallic environment 50 without any hand soldering. As an example and in a non-limitative way, the wire antenna 18 may have a 260.78 mm length with 6 spires placed on both sides 21, 22 of the printed circuit board 14.

Figure 6:
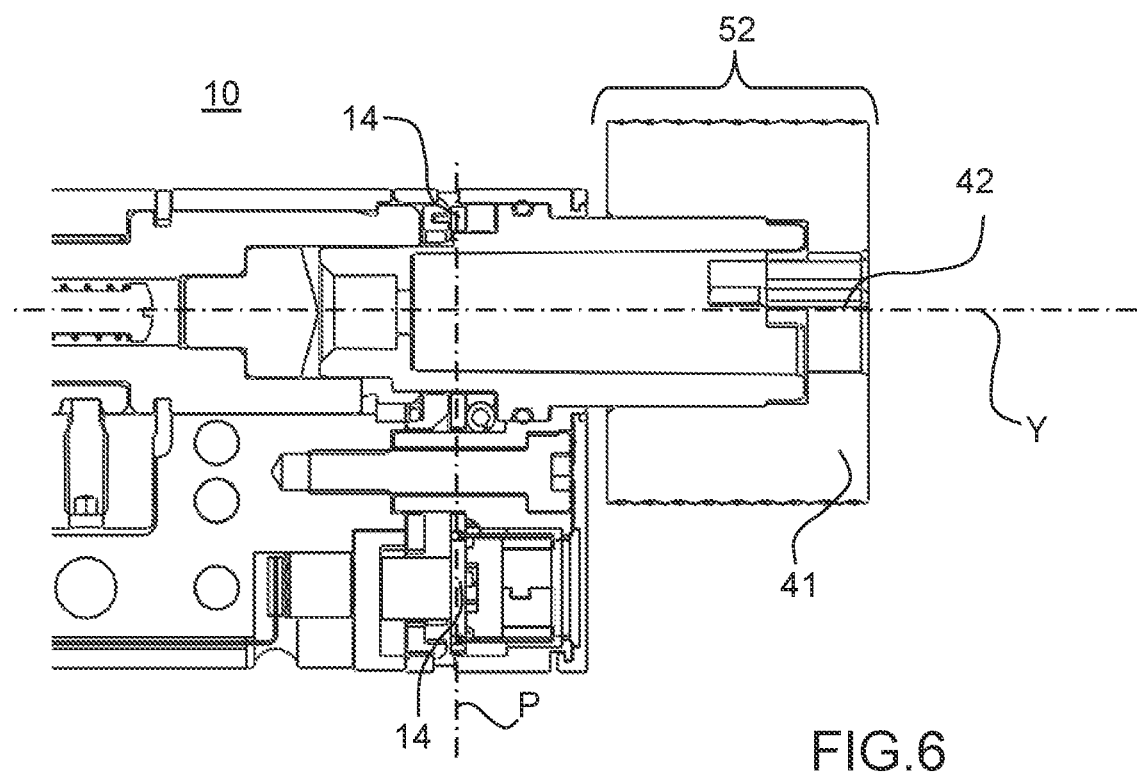
FIG. 6 schematically represents a cut view of the locking mechanism according to the invention.

FIG. 6 schematically represents a cut view of the locking mechanism 10 according to the invention and FIG. 7 schematically represents a cut view of the locking mechanism 10 with an inserted identification key 13 according to the invention.

The NFC passive part 16 of the identification key 13 comprises a wire antenna 32 and a chip 33 connected to the wire antenna 32 and configured to store the identification code 12. The NFC passive part 16 of the identification key 13 comprises a core 31 around which the wire antenna 32 is wounded, preferably a ferrite core.

The wire antenna 32 of the NFC passive part 16 is configured to provide the chip 33 with energy when the NFC active part 17 generates a magnetic field.

The front part 41 of the locking mechanism 10 is the outdoor part 52 of the locking mechanism. The aperture 42 of the locking mechanism 10 is in this front part 41 and is dedicated to the introduction of the outer part of the identification key 13.

The battery 23 of the locking mechanism 10 provides the NFC active part 17 with energy. Following this, the wire antenna 18 of the NFC active part 17 generates a magnetic field. This magnetic field has a high level in the middle of the wounded antenna 18, where the wire antenna 32 of the NFC passive part 16 is inserted. It results in an energy supply to the NFC passive part 16 of the identification key 13. The chip 33 of the identification key 13 is now supplied with energy and can transfer data (such as its identification code 12) to the locking mechanism 10.

Figure 8:
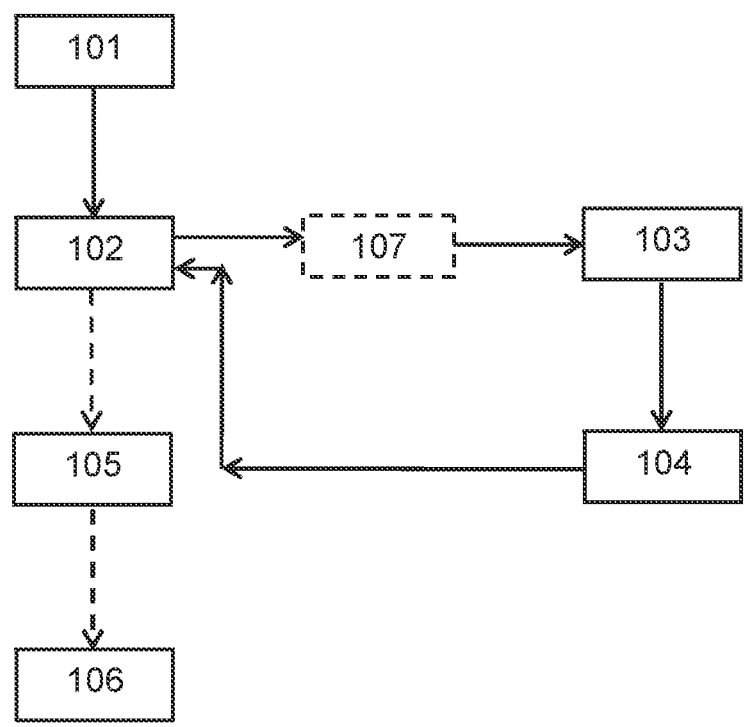
FIG. 8 represents a block diagram of the steps of a method for establishing a NFC communication between a NFC active part of a locking mechanism and a NFC passive part of an identification key according to the invention.

FIG. 8 represents a block diagram of the steps of a method for establishing a NFC communication between a NFC active part 17 of a locking mechanism 10 and a NFC passive part 16 of an identification key 13 according to the invention. The locking mechanism 10 is configured to switch from a locked state to an unlocked state, said locking mechanism 10 comprising a processor 11 configured to read an identification code 12 of the identification key 13 and configured to cause the locking mechanism 10 to switch from the locked state to the unlocked state if the identification code 12 of the identification key 13 is an authorized code of the locking mechanism 10, a printed circuit board 14 in a first plane comprising an aperture 15 configured to accept insertion of the identification key 13 according to a first axis Y secant to the printed circuit board 14, and a NFC active part 17 comprising a wire antenna 18 positioned on the printed circuit board 14, the wire antenna 18 comprising a first at least one winding 19 around the aperture 15, the wire antenna 18 being connected to the processor 11, the identification key 13 comprising a NFC passive part 16. The method of the invention comprises the steps of inserting (step 101) the identification key 13 into the aperture 15, establishing (step 102) a NFC communication between the NFC active part 17 of the locking mechanism 10 and the NFC passive part 16 of the identification key 13.

The NFC passive part 16 of the identification key 13 may comprise a core 31, preferably a ferrite core, a wire antenna 32, preferably around the ferrite core, a chip 33 connected to the wire antenna 32 and configured to store the identification code 12. The step 102 of establishing the NFC communication between the NFC active part 17 of the locking mechanism 10 and the NFC passive part 16 of the identification key 13 comprises the steps of generating (step 103) a magnetic field by the wire antenna 18 of the NFC active part 17, thereby providing energy to the NFC passive part 16 of the identification key 13, i.e. powering up the NFC passive part 16, and providing (step 104) the chip 33 with energy by the wire antenna 32 of the NFC passive part 16. The step 103 of generating a magnetic field may be preceded by a step 107 of detecting the identification key 13.

Once the NFC communication between the locking mechanism 10 and the identification key 13 is established, the method of the invention may further comprise the steps of sending (step 105) an identification code 12 from the chip 33 of the NFC passive part 16 to the NFC active part 17; and determining (step 106) by the processor 11 of the locking mechanism 10 whether the identification code 12 sent from the chip 33 is an authorized code.

The examples disclosed in this specification are therefore only illustrative of some embodiments of the invention and may be combined. They do not in any manner limit the scope of said invention which is defined by the appended claims.

The invention claimed is:

1. A locking mechanism configured to switch from a locked state to an unlocked state when reading an identification code of an identification key that is an authorized code of the locking mechanism, comprising:
   a processor configured to read an identification code of an identification key and configured to cause the locking mechanism to switch from the locked state to the unlocked state if the identification code of the identification key is an authorized code of the locking mechanism, a printed circuit board in a first plane comprising an aperture configured to accept insertion of the identification key according to a first axis secant the printed circuit board through the aperture, the identification key comprising a Near Field Communication passive part, the Near Field Communication passive part of the identification key comprising a wire antenna and a chip connected to the wire antenna and configured to store the identification code, a Near Field Communication active part comprising a wire antenna positioned on the printed circuit board, the wire antenna comprising a first at least one winding around the aperture, the wire antenna being connected to the processor, the wire antenna of the Near Field Communication active part is configured to generate a magnetic field when the Near Field Communication active part is provided with energy, thereby providing energy as a result of a relative movement between the passive part and the active part, when the passive part is inserted through the first at least one winding of the wire antenna of the reader to the Near Field Communication passive part of the identification key, wherein the locking mechanism is configured to establish a Near Field Communication communication between the Near Field Communication active part of the locking mechanism and the Near Field Communication passive part of the identification key when the identification key is inserted into the aperture.

2. The locking mechanism of claim 1, wherein the wire antenna of the Near Field Communication active part comprises a second at least one winding around the aperture, the first at least one winding being positioned on a first side of the printed circuit board and the second at least one winding being positioned on a second side of the printed circuit board, opposite to the first side, and/or the wire antenna) of the Near Field Communication active part comprises at least a third at least one winding around the aperture, the third at least one winding being positioned inside the printed circuit board.

3. The locking mechanism of claim 1, wherein the first axis is perpendicular to the printed circuit board.

4. The locking mechanism of claim 1, comprising a battery configured to provide the Near Field Communication active part with energy.

5. The locking mechanism of claim 1, wherein the Near Field Communication passive part of the identification key comprises a core around which the wire antenna is wound, preferably a ferrite core.

6. The locking mechanism of claim 1, wherein the wire antenna of the Near Field Communication passive part is configured to provide the chip with energy when the Near Field Communication active part generates the magnetic field.

7. The locking mechanism of claim 1, wherein the processor comprises an algorithm of asymmetrical cryptography configured to verify that the identification code is the authorized code of the locking mechanism.

8. An identification key configured to cooperate with a locking mechanism, configured to switch from a locked state to an unlocked state, said locking mechanism comprising:

a processor configured to read an identification code of the identification key and configured to cause the locking mechanism to switch from the locked state to the unlocked state if the identification code of the identification key is an authorized code of the locking mechanism, a printed circuit board in a first plane comprising an aperture configured to accept insertion of the identification key according to a first axis intersecting the first plane of the printed circuit board through the aperture, a Near Field Communication active part comprising a wire antenna positioned on the printed circuit board, the wire antenna comprising a first at least one winding around the aperture, the wire antenna being connected to the processor, the identification key comprising a Near Field Communication passive part, the Near Field Communication passive part of the identification key comprising a wire antenna and a chip connected to the wire antenna and configured to store the identification code, wherein the identification key is adapted to be inserted into the aperture, thereby establishing a Near Field Communication communication between the Near Field Communication active part of the locking mechanism and the Near Field Communication passive part of the identification key wherein the wire antenna of the Near Field Communication passive part is configured to provide the chip with energy when the Near Field Communication active part of the locking mechanism generates a magnetic field thereby providing energy as a result of a relative movement between the passive part and the active part, when the passive part is inserted through the first at least one winding of the wire antenna of the reader to the Near Field Communication passive part of the identification key.

9. The identification key of claim 8, wherein the Near Field Communication passive part of the identification key comprises a core around which the wire antenna is wound, preferably a ferrite core.

10. A method for establishing a Near Field Communication communication between a Near Field Communication active part of a locking mechanism and a Near Field Communication passive part of an identification key, the locking mechanism configured to switch from a locked state to an unlocked state when reading an identification code of an identification key that is an authorized code of the locking mechanism, said locking mechanism comprising a processor configured to read an identification code of the identification key and configured to cause the locking mechanism to switch from the locked state to the unlocked state if the identification code of the identification key is an authorized code of the locking mechanism, a printed circuit board in a first plane comprising an aperture configured to accept insertion of the identification key according to a first axis secant to the printed circuit board through the aperture, and a Near Field Communication active part comprising a wire antenna positioned on the printed circuit board, the wire antenna comprising a first at least one winding around the aperture, the wire antenna being connected to the processor, the identification key comprising a Near Field Communication passive part, the Near Field Communication passive part of the identification key comprising a wire antenna and a chip connected to the wire antenna and configured to store the identification code, said method comprising:
inserting the identification key into the aperture;
generating a magnetic field by the wire antenna of the Near Field Communication active part, thereby providing energy to the Near Field Communication passive part of the identification key;
providing a chip with energy by the wire antenna of the Near Field Communication passive part as a result of a relative movement between the passive part and the active part, when the passive part is inserted through the first at least one winding of the wire antenna of the reader to the Near Field Communication passive part of the identification key;

establishing a Near Field Communication communication between the Near Field Communication active part of the locking mechanism and the Near Field Communication passive part of the identification key.

11. The method of claim 10, further comprising:

sending an identification code from the chip of the Near Field Communication passive part to the Near Field Communication active part;

determining by the processor of the locking mechanism whether the identification code sent from the chip is the authorized code.

12. A locking set comprising:

a locking mechanism;

an identification key; and wherein the locking mechanism is configured to switch from a locked state to an unlocked state when reading an identification code of the identification key that is an authorized code of the locking mechanism, the locking mechanism comprising:
- a processor configured to read an identification code of an identification key and configured to cause the locking mechanism to switch from the locked state to the unlocked state if the identification code of the identification key is an authorized code of the locking mechanism,
- a printed circuit board in a first plane comprising an aperture configured to accept insertion of the identification key according to a first axis (intersecting the first plane of the printed circuit board through the aperture, the identification key comprising a Near Field Communication passive part, the Near Field Communication passive part of the identification key comprising a wire antenna and a chip connected to the wire antenna and configured to store the identification code,
- a Near Field Communication active part comprising a wire antenna positioned on the printed circuit board, the wire antenna comprising a first at least one winding around the aperture, the wire antenna being connected to the processor,
- the wire antenna of the Near Field Communication active part is configured to generate a magnetic field when the Near Field Communication active part is provided with energy as a result of a relative movement between the passive part and the active part, when the passive part is inserted through the first at least one winding of the wire antenna of the reader, thereby providing energy to the Near Field Communication passive part of the identification key,
- wherein the locking mechanism is configured to establish a Near Field Communication communication between the Near Field Communication active part of the locking mechanism and the Near Field Communication passive part of the identification key when the identification key is inserted into the aperture; and the identification key comprising a Near Field Communication passive part, the Near Field Communication passive part of the identification key comprising a wire antenna and a chip connected to the wire antenna and configured to store the identification code, wherein the identification key is adapted to be inserted into the aperture, thereby establishing a Near Field Communication communication between the Near Field Communication active part of the locking mechanism and the Near Field Communication passive part of the identification key.

* * * * *